May 30, 1939.  J. W. BOTSFORD  2,160,012
CONNECTING ROD
Filed Jan. 31, 1938   2 Sheets-Sheet 1
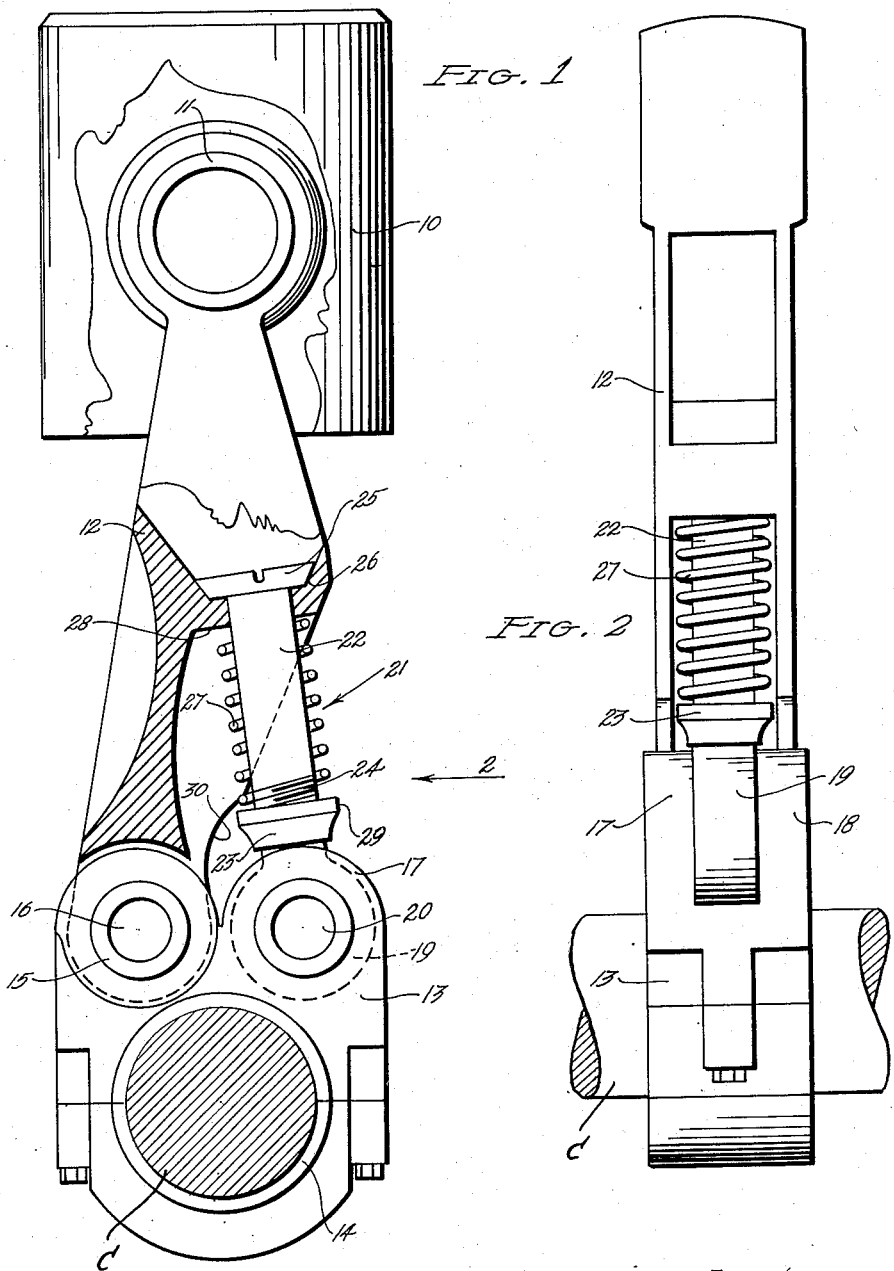
Inventor
JOHN W. BOTSFORD
By Hazard and Miller
Attorneys May 30, 1939.  J. W. BOTSFORD  2,160,012
CONNECTING ROD
Filed Jan. 31, 1938   2 Sheets-Sheet 2

Inventor
JOHN W. BOTSFORD

By Hazard and Miller
Attorneys

Patented May 30, 1939

2,160,012

UNITED STATES PATENT OFFICE 2,160,012

CONNECTING ROD

John W. Botsford, Los Angeles, Calif.

Application January 31, 1938, Serial No. 187,906

3 Claims. (Cl. 74—581)

This invention relates to connecting rods which connect pistons to crankshafts. It has been primarily designed for use in internal combustion engines but may be used in other types of engines wherein like circumstances are present.

In the conventional internal combustion engine, when the piston is at the beginning of its working or power stroke, the connecting rod is in a position wherein it is radially arranged with respect to the axis of rotation of the crankshaft, consequently at the time of firing of the fuel and at the time when there is a maximum of working effort on the piston, the relationship of the connecting rod to the crankshaft is such that only a small proportion of the available power is directed so as to produce rotation of the crankshaft. As the piston proceeds on its working stroke and the crankshaft rotates the connecting rod continually approaches a position tangentially to the path of the crank throw. However, when the tangential position is reached the effort created by the ignited fuel is materially reduced with the result that when the crankshaft and the connecting rod are in such positions as to be capable of transmitting the entire power of the piston, the effective power on the piston is reduced. In other words, when there is a maximum force imposed upon the piston by the burning fuel, the connecting rod and crankshaft are in positions such that only a small proportion may be used to bring about rotation of the crankshaft. When the connecting rod and crankshaft are in such positions as to be capable of transmitting the forces most efficiently, the piston is in a position wherein only a proportion of the forces capable of being created by the burning fuel is effective thereon.

An object of the present invention is to provide a connecting rod for internal combustion engines and the like, which is of such design as to increase the efficiency of the engine by causing the forces transmitted by the connecting rod to the crankshaft to be transmitted in a direction more closely approaching the tangent to the path of rotation of the crank throw when the piston is at the start of its working or power stroke.

Another object of the invention is to provide a connecting rod construction which is more efficient in that stresses and strains on the piston are in effect relieved and stresses and strains on the connecting rod itself and on the crankshaft are relieved by the cushioning action present in the improved connecting rod.

Another object of the invention is to provide a connecting rod which is of relatively simple and durable construction and which may be substituted for connecting rods now generally employed in the conventional internal combustion engine.

With the foregoing and other objects in view, which will be made manifest in the following detailed description and specifically pointed out in the appended claims, reference is had to the accompanying drawings for an illustrative embodiment of the invention, wherein:

Figure 1 is a view of the improved connecting rod illustrating a piston thereon, parts of the connecting rod being broken away and shown in vertical section, the connecting rod being shown in its normal position immediately prior to the firing of the fuel in the cylinder of the engine;

Fig. 2 is a view in end elevation of the connecting rod and may be considered as having been taken in the direction of the arrow 2 upon Fig. 1.

Figure 3:
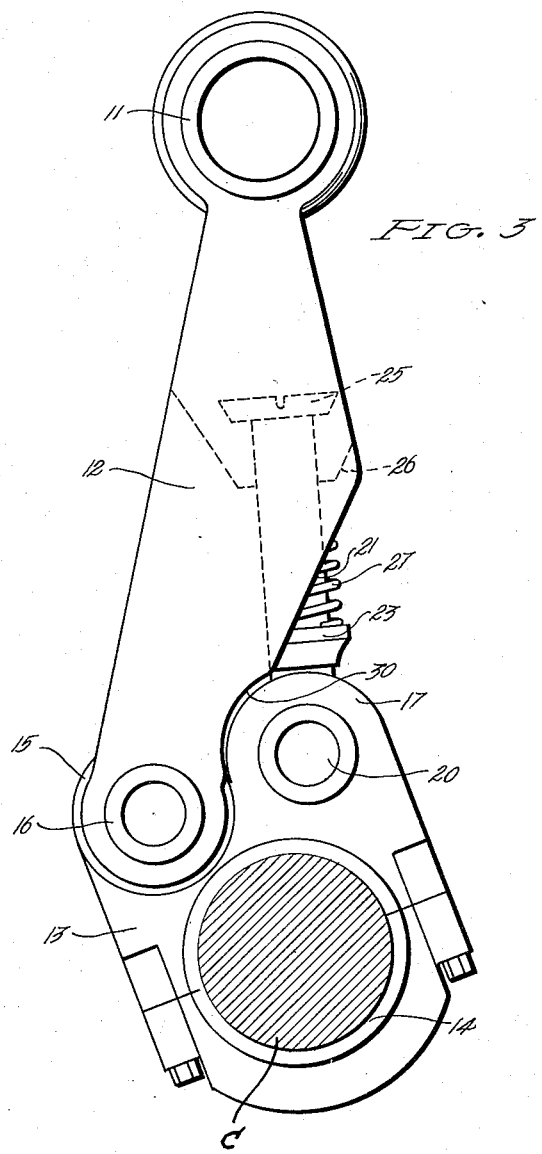
Fig. 3 is a view similar to Fig. 1, illustrating the position of the connecting rod that is assumed by it at the start of the working or power stroke of the piston.

Referring to the accompanying drawings wherein similar reference characters designate similar parts throughout, 10 designates a piston of an internal combustion engine or the like which piston may be of any preferred design or construction. The upper end of the connecting rod may be connected to the piston by a wrist pin, the bearing for which is illustrated at 11. Any suitable connection between the connecting rod and the piston may be employed.

The connecting rod consists of two main parts, the upper of which is indicated at 12 and the lower of which is indicated at 13. The lower part 13 provides the bearing 14 for the crankshaft throw C. The lower part 13 has at its back a central knuckle 15 and the upper part 12 has its lower end bifurcated and provided with two knuckles arranged on opposite sides of the central knuckle 15. A wrist pin 16 extends through the aligned knuckles so as to pivotally connect the upper part 12 to the lower part 13. At the forward end of the lower part 13 there are formed two spaced knuckles 17 and 18 between which there is disposed a knuckle 19. A wrist pin 20 extends through the aligned knuckles 17, 18, and 19 and serves to pivotally connect a stem 21 to the lower part 13. The stem is preferably formed of two parts 22 and 23 threadedly connected as indicated at 24. The top of the stem is provided with a cap or head 25 adapted to seat against a seat 26 formed in the upper part 12. A coil spring 27 is compressed between a spring seat 28 on the upper part 12 and a shoulder 29 on the stem.

As clearly indicated in Fig. 3 the forward sides of the upper part 12 are shaped so as to provide abutments 30 which are engageable with the backs of knuckles 17 and 18 to limit the angular movement of the parts of the connecting rod.

The operation and advantages of the above-described connecting rod are as follows: The normal position of the connecting rod is as shown in Fig. 1. In this position, the cap or head 25 on the stem being in engagement with the seat 26 limits the position of the parts so that the connecting rod is in vertical alignment as shown. At the beginning of the power stroke when the forces imposed on the piston are at a maximum due to the fact that the center of wrist pin 16 is off-center or to the left of the line joining the center of the piston wrist pin, and the center of the crank throw, there is a tendency of the connecting rod to bend about the center of the wrist pin 16 from the position shown in Fig. 1 into the position shown in Fig. 3. This tendency is somewhat resisted by the compressed coil spring 27. However, when the effort on the piston 10 is at a maximum, it is sufficient to overcome the effect of the coil spring and to cause the coil spring to compress. During this movement, the stem 21 merely slides up through the aperture in the upper part 12 of the connecting rod. When the connecting rod has thus shifted from the position shown in Fig. 1 into the position shown in Fig. 3, it is manifest that the upper part 12 more closely approaches a position wherein it is tangent to the path of the throw of the crankshaft. Consequently, when the maximum force is applied to the piston 10 the connecting rod is more closely in a position to transmit a major portion of this force in a rotational direction to the crankshaft. As the piston continues on its working stroke and the effect of the ignited fuel decreases, the spring 27 becomes effective to return the parts of the connecting rod from the position shown in Fig. 3 to the position shown in Fig. 1. The strength of the spring 27 is such as to permit bending of the connecting rod only when the maximum force is applied to the piston. During the remainder of the cycle of the engine the spring 27 maintains the connecting rod in the position shown in Fig. 1, wherein it functions substantially the same as the conventional connecting rod. In other words, in the case of a four cycle engine, it is intended that the connecting rod assume the position in Fig. 3 only during the working or power stroke of the piston. During the scavenging stroke, the intake stroke, and the compression stroke it is intended that the connecting rod assume the position shown in Fig. 1. The strength of the spring 27 must be designed for various engines having various sizes of pistons, lengths of stroke, and compression ratios.

It will be understood that the present connecting rod is not only useful in four cycle engines but is capable of being used on two cycle engines, Diesel engines, and even on steam engines.

From the above-described construction, it will be appreciated that an improved connecting rod has been provided wherein, by changing the effective angular position of the connecting rod with respect to the crank throw at the time that the maximum force is exerted on the piston, the efficiency of the engine may be materially increased. The stem 21 serves to limit pivoting of the parts of the connecting rod in one direction to the position shown in Fig. 1. Bending of the parts with respect to each other into the position shown in Fig. 3 is limited by the engagement of the abutments 30 with knuckles 17 and 18.

Various changes may be made in the details of construction without departing from the spirit or scope of the invention as defined by the appended claims.

I claim:

1. A connecting rod comprising one section adapted to be connected to a wrist pin and a second section adapted to be connected to a crank throw, said sections being pivotally connected together at a point laterally with respect to the center line through the wrist pin and crank throw, a stem pivotally connected to the second section and slidably extending through a portion of the first section, means on the stem engageable with the first section to limit pivotal movement of the section relative to each other, and a spring around the stem urging said sections apart.

2. A connecting rod comprising a first section adapted to be connected to a wrist pin, a second section adapted to be connected to a crank throw, means pivotally connecting the sections together, the pivotal connection between the sections being laterally arranged on one side of the center line connecting the wrist pin and crank throw, a stem pivotally connected to the second section on the opposite side of said center line, said pin slidably extending through the first section, means on the pin limiting movement of the first section relative to the second section in one direction, and spring means urging the first section to move relative to the second section in said direction.

3. A connecting rod comprising a first section adapted to be connected to a wrist pin, a second section adapted to be connected to a crank throw, means pivotally connecting the sections together, the pivotal connection between the sections being laterally arranged on one side of the center line connecting the wrist pin and crank throw, a stem pivotally connected to the second section on the opposite side of said center line, said pin slidably extending through the first section, means on the pin limiting movement of the first section relative to the second section in one direction, spring means urging the first section to move relative to the second section in said direction, and means limiting pivotal movement of the first section relative to the second section in the opposite direction.

JOHN W. BOTSFORD.